(12) United States Patent
Sato et al.

(10) Patent No.: US 10,180,196 B2
(45) Date of Patent: Jan. 15, 2019

(54) FLUID CONTROL APPARATUS

(71) Applicant: AISIN SEIKI KABUSHIKI KAISHA, Kariya-shi, Aichi (JP)

(72) Inventors: Atsushi Sato, Toyota (JP); Yasuo Ozawa, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 15/318,844

(22) PCT Filed: Aug. 12, 2015

(86) PCT No.: PCT/JP2015/072858
§ 371 (c)(1),
(2) Date: Dec. 14, 2016

(87) PCT Pub. No.: WO2016/047304
PCT Pub. Date: Mar. 31, 2016

(65) Prior Publication Data
US 2017/0130640 A1    May 11, 2017

(30) Foreign Application Priority Data

Sep. 25, 2014  (JP) ................................. 2014-195569

(51) Int. Cl.
*F16K 31/08*  (2006.01)
*F02M 26/30*  (2016.01)
(Continued)

(52) U.S. Cl.
CPC ............. *F16K 31/084* (2013.01); *B60H 1/02* (2013.01); *F01P 5/12* (2013.01); *F01P 7/14* (2013.01);
(Continued)

(58) Field of Classification Search
CPC .............. F16K 31/084; Y10T 137/7905; F01P 2007/146; F01P 2060/08; F01P 7/14;
(Continued)

(56) References Cited

U.S. PATENT DOCUMENTS 5,513,395 A * 5/1996 Chlebek .................... E03D 5/01
                                                                 137/529
2010/0281901 A1* 11/2010 Kawase ............. B60H 1/00885
                                                                 62/238.7

(Continued)

FOREIGN PATENT DOCUMENTS

DE      102006020354 A1    10/2007
EP        3 086 009 A      10/2016
(Continued)

OTHER PUBLICATIONS

Extended European Search Report dated Sep. 27, 2017, issued by the European Patent Office in corresponding European Application No. EP 15843692.3 (9 pages).

(Continued)

*Primary Examiner* — Atif Chaudry
(74) *Attorney, Agent, or Firm* — Buchanan Ingersoll & Rooney PC (57) ABSTRACT

A fluid control apparatus configured to be able to reduce electric power consumption required for opening/closing operations of a fluid control valve includes a valve body and a valve seat one of which is formed of a magnetic material and the other of which includes a magnet, the valve body and the valve seat being incorporated in a fluid flow passage and movable to come into contact with or away from each other to control communication of fluid, an urging member configured to urge the valve body toward the valve seat, an electric pump for flowing the fluid in the flow passage, and a control section for effecting control to increase an output of the electric pump to a preset state when the valve body (Continued)

under a closed state as being in contact with the valve seat is to be opened.

6 Claims, 7 Drawing Sheets

(51) Int. Cl.
    *B60H 1/02*     (2006.01)
    *F02M 26/28*     (2016.01)
    *F01P 5/12*     (2006.01)
    *F01P 7/14*     (2006.01)
    *F16K 15/02*     (2006.01)
    *F01P 7/16*     (2006.01)

(52) U.S. Cl.
    CPC .............. *F01P 7/164* (2013.01); *F02M 26/28* (2016.02); *F02M 26/30* (2016.02); *F16K 15/028* (2013.01); *F01P 2005/125* (2013.01); *F01P 2007/146* (2013.01); *F01P 2060/08* (2013.01); *Y10T 137/7905* (2015.04)

(58) Field of Classification Search
    CPC ......... F01P 7/164; F02M 26/28; F02M 26/30; F02B 29/0443; B60H 1/02
    See application file for complete search history.

(56) References Cited

U.S. PATENT DOCUMENTS

2012/0132154 A1* 5/2012 Suzuki .................... F01P 7/164
                                                      123/41.02

2013/0020513 A1     1/2013   Matsusaka et al.

FOREIGN PATENT DOCUMENTS

| | | |
|---|---|---|
| JP | 55-121216 U | 8/1980 |
| JP | 2005-009506 A | 1/2005 |
| JP | 2013-525653 A | 6/2013 |
| JP | 2013108398 A | 6/2013 |
| WO | 2011/132530 A2 | 10/2011 |
| WO | 2011/157524 A2 | 12/2011 |

OTHER PUBLICATIONS

International Search Report (PCT/ISA/210) dated Nov. 2, 2015, by the Japanese Patent Office as the International Searching Authority for International Application No. PCT/JP2015/072858.

Written Opinion (PCT/ISA/237) dated Nov. 2, 2015, by the Japanese Patent Office as the International Searching Authority for International Application No. PCT/JP2015/072858.

Notification of Transmittal of Translation of the International Preliminary Report on Patentability (Forms PCT/IB/338 and PCT/IB/373) and the Written Opinion of the International Searching Authority (Form PCT/ISA/237) dated Apr. 6, 2017, by the International Bureau of WIPO in corresponding International Application No. PCT/JP2015/072858. (6 pgs).

Communication pursuant to Article 94(3) EPC dated Nov. 20, 2018 issued by the European Patent Office in corresponding EPO Application No. 15843692.3-1004 (6 pages).

* cited by examiner

FLUID CONTROL APPARATUS

TECHNICAL FIELD

The present invention relates to a fluid control apparatus for use in a cooling system of an engine, etc.

BACKGROUND ART

For an engine of a vehicle, for a purpose of e.g. fuel efficiency, a control operation is executed for effecting a warm-up operation when an engine temperature is low or maintaining an engine temperature substantially constant after rise of the engine temperature. As a cooling system for an engine for that purpose, there is known a system configured such that when a cooling water temperature is low, a thermostat valve is closed for causing cooling water to circulate via a bypass passage, not through a radiator and when the cooling temperature becomes higher, the valve is opened for causing the cooling water to circulate through the radiator, thus maintaining cooling water temperature constant.

Patent Document 1 discloses a solenoid valve for use in such engine cooing system, the solenoid valve having a movable portion provided at an outlet of the engine and urged to a closing direction by a spring. This solenoid valve is rendered into a closed state at time of coil excitation and is rendered into an opened state at time of no coil excitation. Further, with this solenoid valve, when the coil is excited, a valve body is drawn to a valve seat to maintain the closed state, thus stopping flow of cooling water in the entire cooling system. Under this state, as heat inside the engine is not discharged to the outside via the cooling water, warm-up is promoted. Thereafter, upon detection of rise of the temperature inside the engine to a predetermined temperature, the coil of the solenoid valve is rendered into a non-excited state, whereby the solenoid valve will be rendered into the opened state as receiving the fluid pressure of cooling water. With this, an amount of cooling water not heated outside the engine will gush into the engine, thus promoting engine cooling.

PRIOR ART DOCUMENT

Patent Document

Patent Document 1: Japanese Unexamined Patent Application Publication No. 2013-525653

SUMMARY

Problem to be Solved by Invention

In the cooling system for an engine, with the solenoid valve disclosed in Patent Document 1, constant electric power supply thereto is needed for generation of magnetic force in order to keep the valve under its closed state. In this, the solenoid valve necessarily consumes electric power, and resultant power consumption leads to fuel efficiency deterioration.

Then, there is a need for a fluid control apparatus that allows reduction of electric power required for opening/closing operations of a fluid control valve.

Solution

According to a characterizing feature of a fluid control apparatus relating to the present invention, the fluid control apparatus comprises:

a valve body and a valve seat one of which is formed of a magnetic material and the other of which includes a magnet, the valve body and the valve seat being incorporated in a fluid flow passage and movable to come into contact with or away from each other to control communication of fluid;

an urging member configured to urge the valve body toward the valve seat;

an electric pump for flowing the fluid in the flow passage; and a control section for effecting control to increase an output of the electric pump to a preset state when the valve body under a closed state as being in contact with the valve seat is to be opened.

With the above-described configuration, one of the valve body and the valve seat is formed of a magnetic material and the other of the same includes a magnet; and also an urging member is provided for urging the valve body toward the valve seat. With this, the fluid control apparatus can maintain the closed state with utilization of magnetic attraction force of the magnet and also an urging force of the urging member. Further, as there are provided an electric pump for flowing fluid in the flow passage and a control section for effecting control to increase an output of the electric pump to a preset state when the valve body under a closed state as being in contact with the valve seat is to be opened, the fluid control apparatus can make change into the opened state simply by increasing an output from the electric pump.

In this way, the fluid control apparatus maintains the closed state with utilization of magnetic attraction force of the magnet and also effects change into the opened state as receiving fluid pressure from the electric pump. Thus, power consumption of the fluid control apparatus can be reduced. Moreover, in comparison with a solenoid valve, the above arrangement can eliminate a magnetic circuit including such solenoid, whereby an arrangement for opening/closing the valve body can be made simple and manufacture cost too can be reduced.

According to a further characterizing feature of the fluid control apparatus relating to the present invention, the apparatus further comprises:

a first flow passage in which the fluid flows from the electric pump via a radiator;

a second flow passage in which the fluid flows flows from the electric pump via a heater core, with bypassing the radiator; and wherein the control section increases the output of the electric pump in response to occurrence of a fluid request in the second flow passage.

With the above-described configuration, the control section increases the output of the electric pump in response to occurrence of a fluid request in the second flow passage in which the fluid flows flows from the electric pump via a heater core, with bypassing the radiator. With this, hydraulic force from the electric pump overcomes the force (attraction force of magnet and urging mechanism) of the fluid from the electric pump that maintains the valve body under the closed state, whereby the valve body is switched into the opened state. Whereby, fluid is sent into the second flow passage and the fluid can be fed to the heater core.

According to a still further characterizing feature of the fluid control apparatus relating to the present invention, the control section further increases the output of the electric pump when a fluid request is present in the second flow passage and the valve body is under the closed state.

Even when the control section increases the output of the electric pump to a preset state in response to occurrence of a fluid request in the second flow passage, change of the fluid control apparatus to the opened state may not occur, due to e.g. a functional problem in the valve body. Then, in the above-described arrangement, the control section further increases the output of the electric pump when a fluid request is present in the second flow passage AND the valve body is under the closed state. With this, since the hydraulic pressure from the electric pump to the valve body is further increased, the fluid control apparatus can be shifted into the opened state in a reliable manner.

BRIEF DESCRIPTION OF THE DRAWINNGS

EMBODIMENTS

Next, embodiments of a fluid control apparatus relating to the present invention will be explained with reference to the accompanying drawings.

Figure 1:
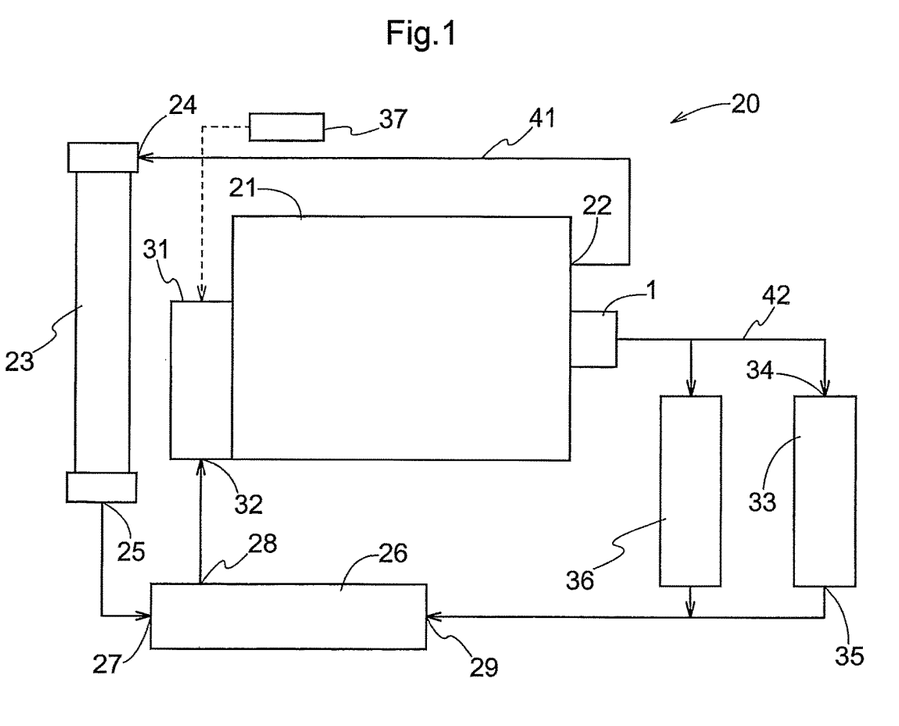
FIG. 1 is a schematic view showing a general arrangement of an engine cooling system.

FIG. 1 is an explanatory view showing a general configuration of a fluid control apparatus 20. To an outflow port 22 for cooling water (cooling liquid) of an engine 21, an inflow port 24 of a radiator 23 is connected. An outflow port 25 of the radiator 23 is connected to an inflow port 27 of a thermostat valve 26. An outflow port 28 of the thermostat valve 26 is connected to an inlet port 32 of an electric pump 31 and an unillustrated discharge port of the electric pump 31 is connected to an unillustrated cooling water (cooling liquid) inflow port of the engine 21.

An unillustrated warm-up outflow port of the engine 21 is connected to an inflow port 6 (see FIG. 2) of a cooling liquid control valve 1. An outflow port 7 of the cooling liquid control valve 1 is connected to an inflow port 34 of a heater core 33. An outflow port 35 of the heater core 33 is connected to a bypass inflow port 29 of the thermostat valve 26. The bypass inflow port 29 is communicated to the outflow port 28.

The fluid control apparatus 20 includes a first flow passage 41 in which fluid from the electric pump 31 flows via the radiator 23, and a second flow passage 42 in which fluid from the electric pump 31 flows via the core heater 33. The cooling liquid control valve 1 is incorporated in the second flow passage 42. To the second flow passage 42, there is connected an other cooling component 36 (an EGR cooler, etc.) in parallel with the heater core 33. The fluid control apparatus 20 includes a control section 37 for controlling output of the electric pump 31. The electric pump 31, in this embodiment, comprises an electric pump 31 that allows change of its discharge (discharge amount) irrespectively of an engine rotational speed. However, this pump can be a mechanical variable displacement pump also.

Figure 2:
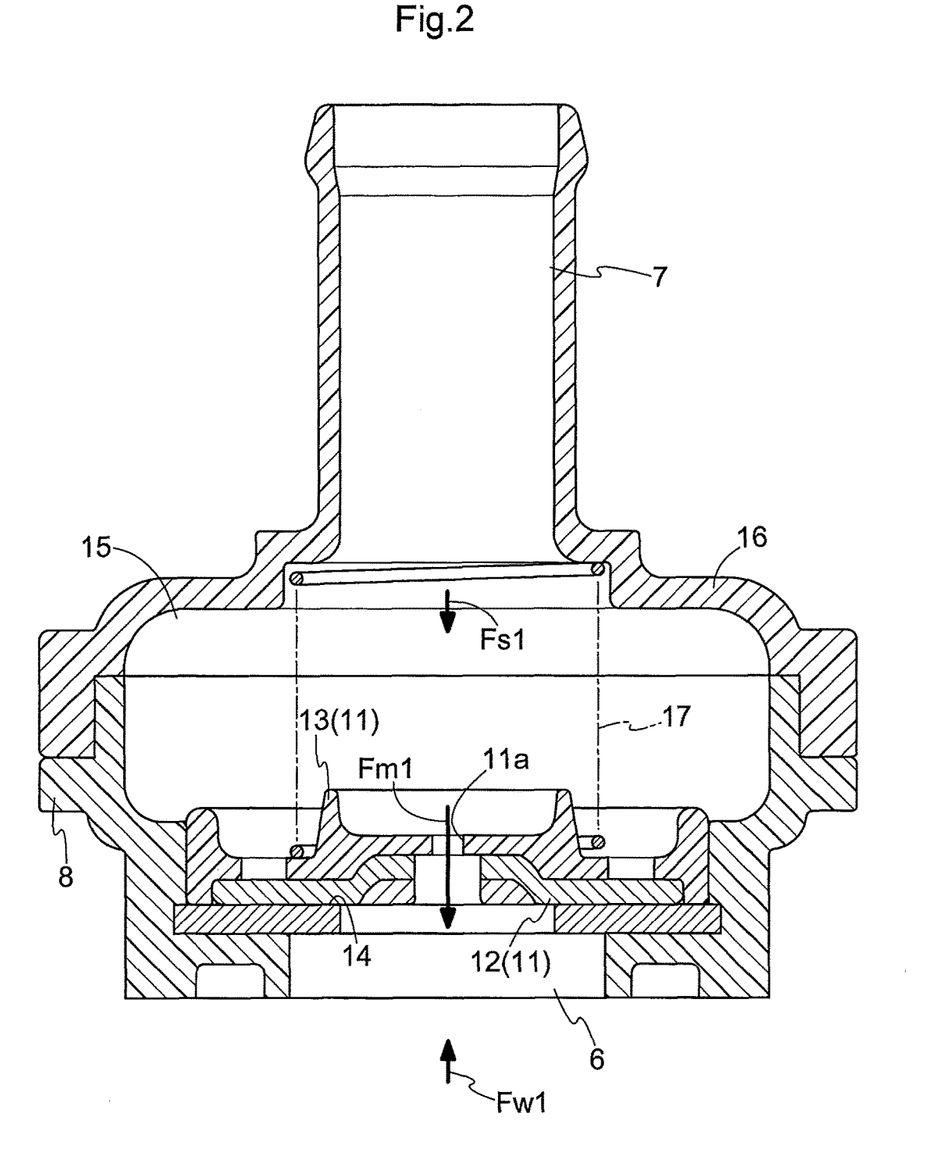
FIG. 2 is a section view of a closed state of a cooling liquid control valve.

The cooling liquid control valve 1, as shown in FIG. 2, includes a housing 8, a valve seat 14, and a valve body 11 movable between a position separated from the valve seat 14 and a position in contact with this valve seat 14. The valve body 11 and the valve seat 14 are provided in a fluid flow passage and one of them is formed of a magnetic material and the other of them includes a magnet so that these come into contact with each other or depart from each other, thus controlling communication of the fluid. In the instant embodiment, the valve body 11 is formed of a magnetic material and the valve seat 14 includes a magnet. Instead, the valve body 11 may include a magnet and the valve seat 14 may be formed of a magnetic material.

The valve body 11 is comprised of a magnetic material 12 and a resin 13 which covers the magnetic material 12. The magnetic material 12 is disposed to be exposed to the valve seat 14. The valve body 11 defines a fluid communication hole 11a. This fluid communication hole 11a constitutes a flow passage of fluid for a small flow rate to be described later. The valve seat 14 is configured such that the magnet is disposed in its face opposed to the valve body 11.

The housing 8 includes an inflow port 6, an outflow port 7, an opening portion 15 formed in coaxial opposition to the inflow port 6, and a cover body 16 which seals the opening portion 15. The outflow port 7 is provided in a direction extending straight from the inflow port 6. Between the valve body 11 and the cover body 16, there is provided a coil spring 17 as an "urging mechanism". The coil spring 17 urges the valve body 11 in the direction toward the valve seat 14. The valve body 11 is brought into contact with the valve seat 14 under an urging force of the coil spring 17 and is attracted to the valve seat 14 under magnetic force from the valve seat 14.

When the electric pump 31 is stopped, no fluid pressure is generated in the inflow port 6 of the cooling liquid control valve 1. Therefore, the valve body 11 is rendered into the closed state as receiving the attraction force of the valve seat 14 (magnet) as well as the urging force of the coil spring 17.

When the electric pump 31 is under operation, if a sum of the attraction force Fm1 of the valve seat 14 (magnet) and the urging force Fs1 of the coil spring 17 is greater than a fluid force (the force provided by the fluid) Fw1 from the electric pump 31, the valve body 11 will be maintained under the state in contact with the valve seat 14 (closed state) (FIG. 2).

Figure 3:
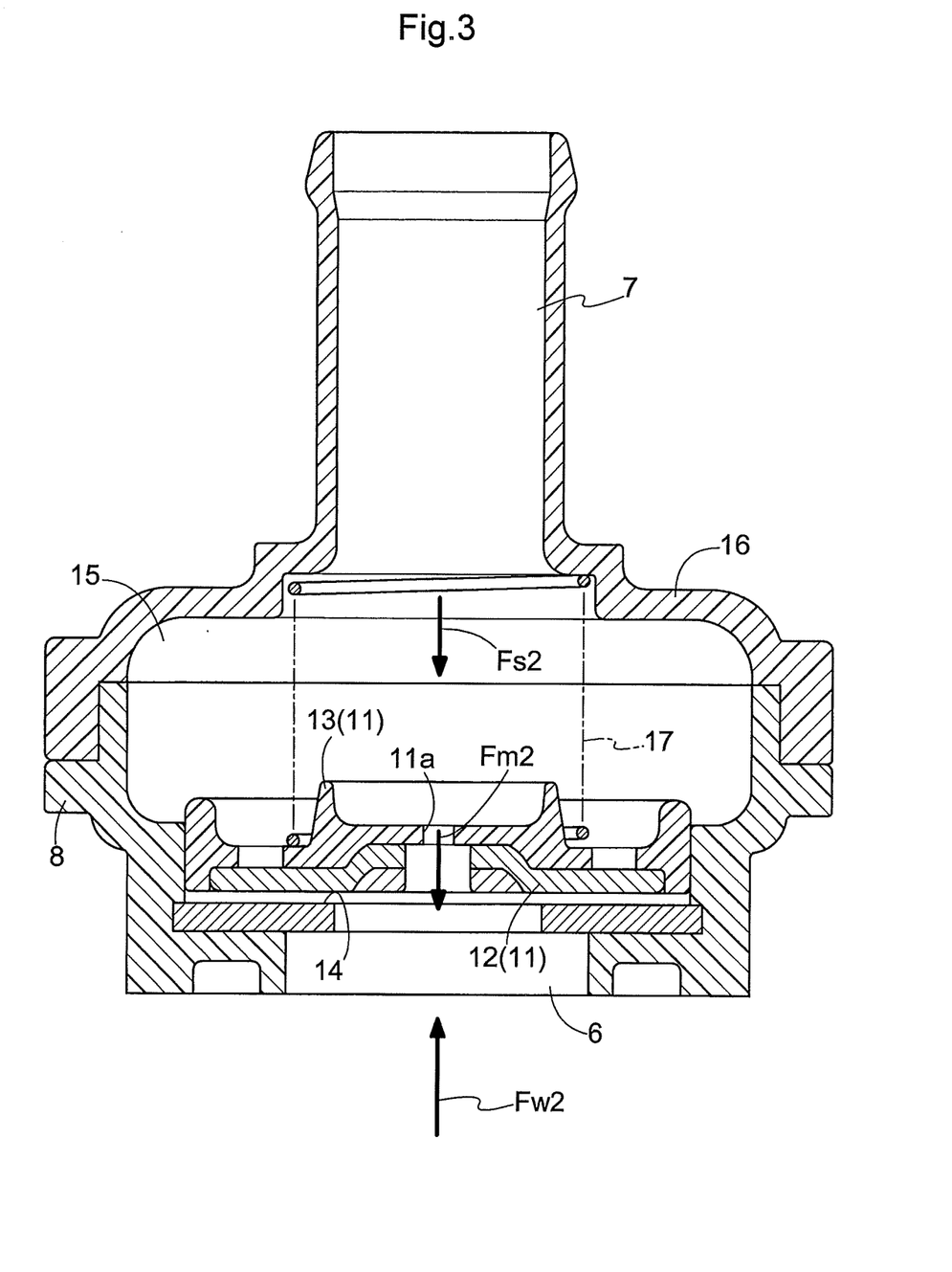
FIG. 3 is a section view of the cooling liquid control valve at time of start of valve opening.
Figure 5:
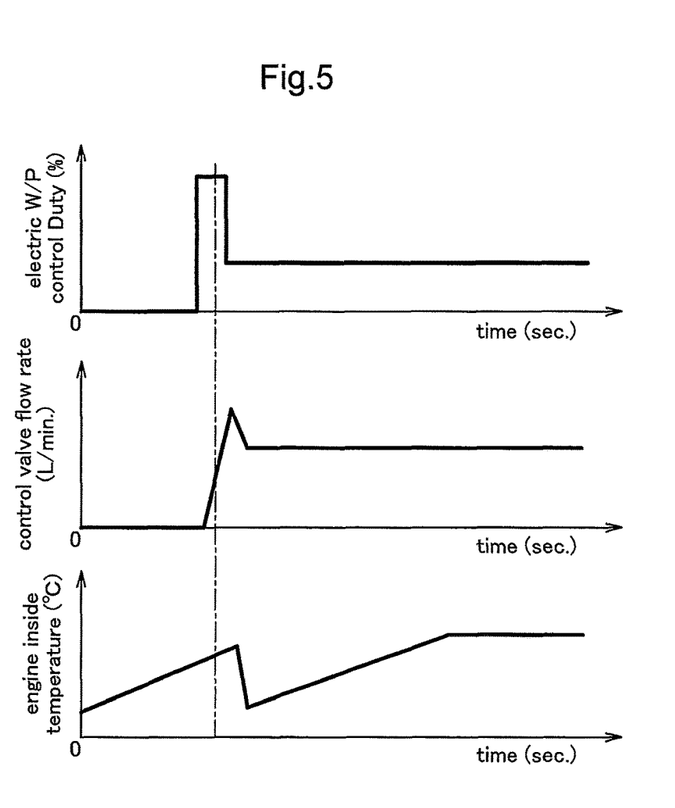
FIG. 5 is a diagram showing relation of an electric pump control Duty, a control valve flow rate, an engine inside temperature, respectively relative to opened/closed states of control valve.
Figure 6:
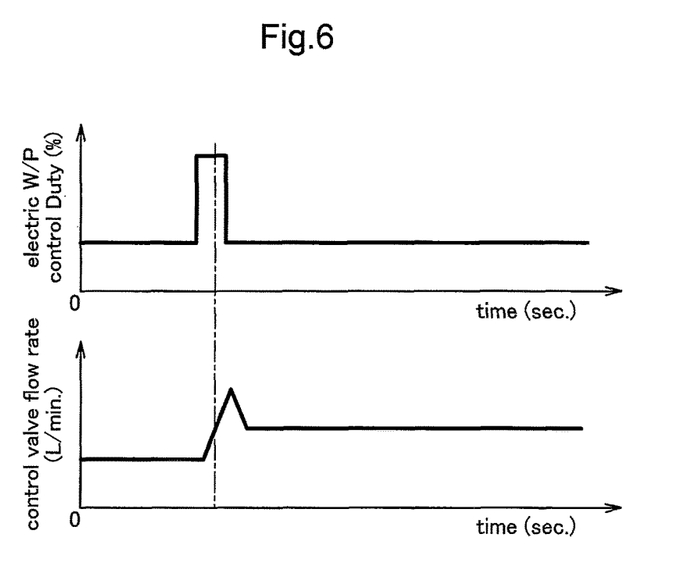
FIG. 6 is a diagram showing relation of an electric pump control Duty, a control valve flow rate, respectively relative to opened/closed states of control valve.

For instance, when the temperature inside the engine 21 rises to a predetermined temperature, the control section 37 effects control for increasing the Duty of the electric pump 31 to a preset Duty so as to render the valve body 11 into the opened state (effects control for increasing the output of the electric pump 31 to a preset state) (see FIG. 5 and FIG. 6). With this, the valve body 11 begins to move in the opening direction (FIG. 3). In order to move the valve body 11 against the attraction force of the valve seat 14 (magnet) and the urging force of the coil spring 17, it is necessary for the fluid force Fw2 acting on the valve body 11 to significantly exceed the sum of the magnet attraction force Fm2 and the urging force Fs2 of the coil spring 17.

Figure 4:
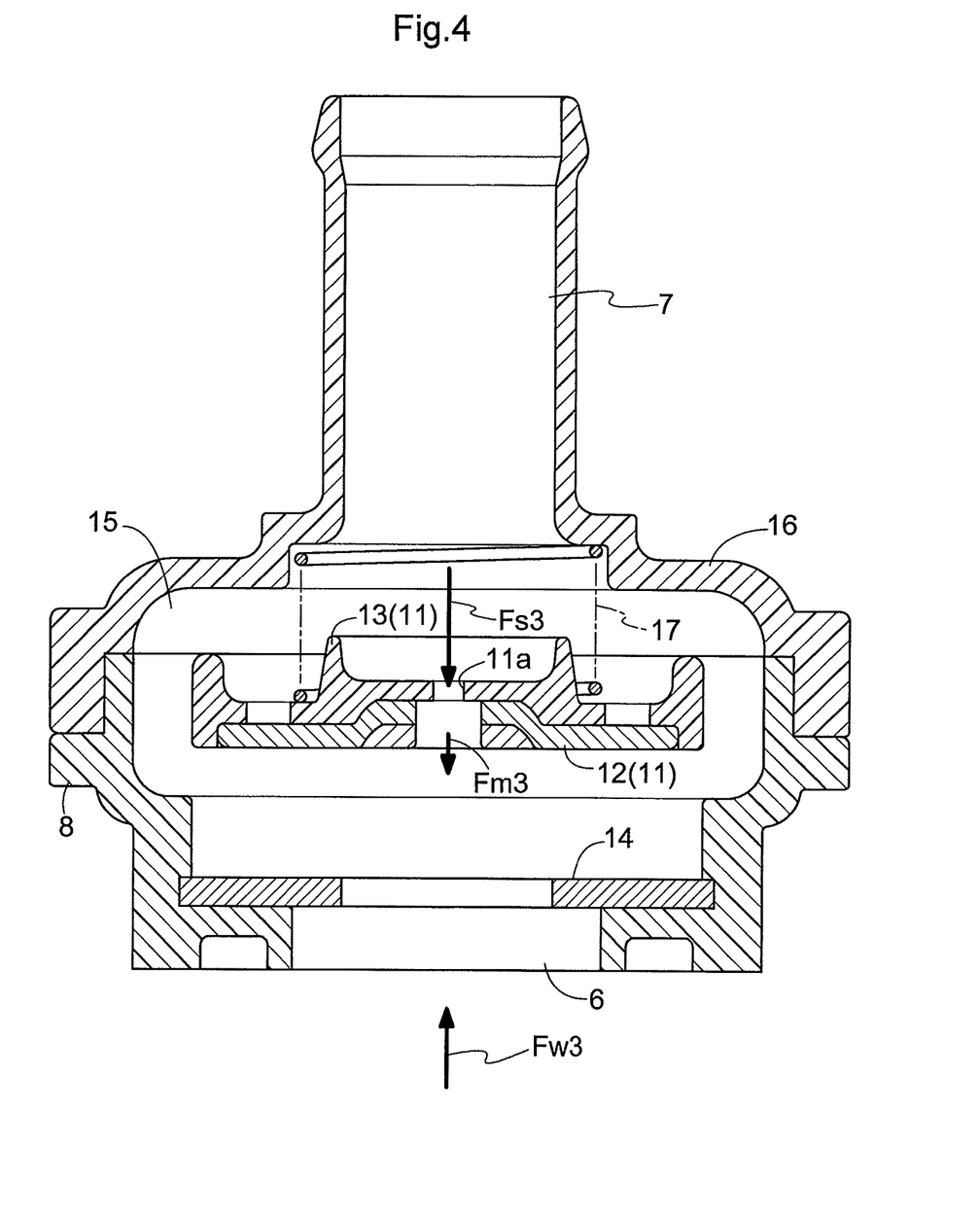
FIG. 4 is a section view of an opened state of the cooling liquid control valve.

As shown in FIG. 4, when the valve body 11 is rendered into the opened state, the attraction force Fm3 of the magnet decreases and the urging force Fs3 of the coil spring 17 increases. In order to maintain the opened state of the cooling liquid control valve 1, it is required that the fluid force Fw3 be greater than the sum of the magnet attraction force Fm3 and the urging force Fs3 of the coil spring 17.

When there is a fluid request with high emergency in the second flow passage 42 for the electric pump 31 which is currently under its stopped state, the control section 37 effects control to activate the electric pump 31 for increasing its Duty to the preset Duty (effects control to activate the electric pump 31 to increase the output to a preset state) (FIG. 5). Then, the valve body 11 is switched to the opened state and fluid is fed via the cooling liquid control valve 1 to the heater core 33 of the second flow passage 42, whereby the temperature inside the engine drops. When the cooling liquid control valve 1 is switched into the opened state, the electric pump 31 is controlled to a Duty which is lower than the maximum Duty at the time of start of valve opening operation. This is because, unlike the time of start of valve opening, the opened state of the cooling liquid control valve 1 is maintained if the above-described fluid force Fw3 is greater than the sum of the magnet attraction force Fm3 and the urging force Fs3 of the coil spring 17.

When there is a fluid request with high emergency in the second flow passage 42 for the electric pump 31 which is currently under its operational state, a small amount of fluid is being fed already from the cooling liquid control valve 1 (communication hole 11a) to the cooling component 36 of the second flow passage 42. In this case, the control section 37 effects control for increasing the Duty of the operated electric pump 31 to the preset Duty (effects control to increase the output of the electric pump 31 under operation to the present state) (FIG. 6). With this, the valve body 11 is switched into the opened state, so that fluid is fed via the cooling liquid control valve 1 to the heater core 33 of the second flow passage 42.

The cooling water is heated inside the engine 21 and then cooled by the radiator 23 and circulates via the thermostat valve 26 by the electric pump 31. When the engine 21 is under a low temperature state, the thermostat valve 26 is under a closed state. At the time of warm-up operation, the cooling water which has been heated inside the engine 21 will be fed under the fluid pressure through the opened cooling liquid control valve 1 to the core heater 33, thus warming up the indoor space. The cooling water cooled by the heater core 33 is circulated by the electric pump 31 via the thermostat valve 26.

In this way, since one of the valve body 11 and the valve seat 14 is formed of a magnetic material and the other includes a magnet, the valve body 11 can be maintained under the closed state with utilizing the attraction force of the magnetic as well as the urging force of the coil spring 17. Moreover, since the fluid control apparatus 20 includes the electric pump 31 and the control section 37 for controlling output of the electric pump 31, the cooling liquid control valve 1 can be switched into the opened state by utilizing a fluid pressure from the electric pump 31.

Since the valve body 11 is opened/closed with utilization of the magnet attraction force as well as the fluid pressure from the electric pump 31, unlike a solenoid valve, there is no need for electric power for opening and closing operations. With this, electric power consumption of the fluid control apparatus 20 can be reduced and improvement of fuel efficiency is made possible. Moreover, as the cooling liquid control valve 1 does not need any magnetic circuit including a solenoid, compactization of the cooling liquid control valve 1 is made possible and its manufacture cost too is reduced.

During e.g. vehicle traveling, if a driver issues a defroster request for instance, this means that the windshield is frosted, so for ensuring visibility, the situation requires high emergency. In this case, the control section 37 effects control based on a flowchart shown in FIG. 7. Firstly, presence/absence of a defroster request is checked (#01). If a defroster request is confirmed (Yes), Duty control of the electric pump 31 is effected (#02) (Duty is increased to the preset Duty; namely, the output is increased). In response to this, based on e.g. a cooling water temperature of the engine 21, the process checks whether the valve body 11 has been rendered into the opened state as receiving a fluid pressure or not (#03).

Figure 7:
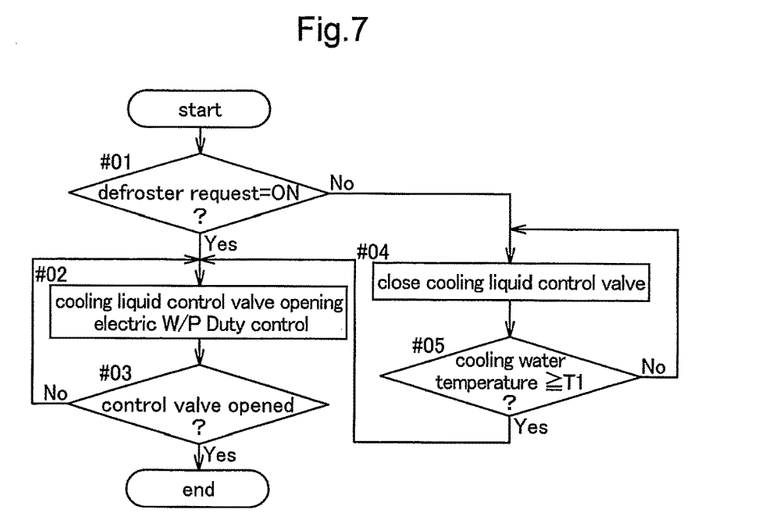
FIG. 7 is a flowchart of opening/closing control for the cooling liquid control valve.

Presence/absence of a defroster request is checked (#01) and if no defroster request is confirmed (No), the Duty of the electric pump 31 is maintained (#04). Thereafter, the process checks whether the temperature of cooling water inside the engine 21 is higher than or equal to a predetermined temperature T1 or not (#05). When the temperature becomes higher than or equal to the predetermined temperature T1, Duty control of the electric pump 31 is effected (#02) (the Duty is increased to the preset Duty, that is, the output is increased).

In this way, with the above arrangement that the valve body 11 can be switched from the closed state to the opened state by the Duty control of the electric pump 31, it becomes possible to feed fluid speedily to the engine 21 when necessary, whereby operability of the cooling liquid control valve 1 is improved. Incidentally, an emergency request by a driver is not limited to the defroster request described above, but can also be a heater request for warm-up for instance.

Second Embodiment

Figure 8:
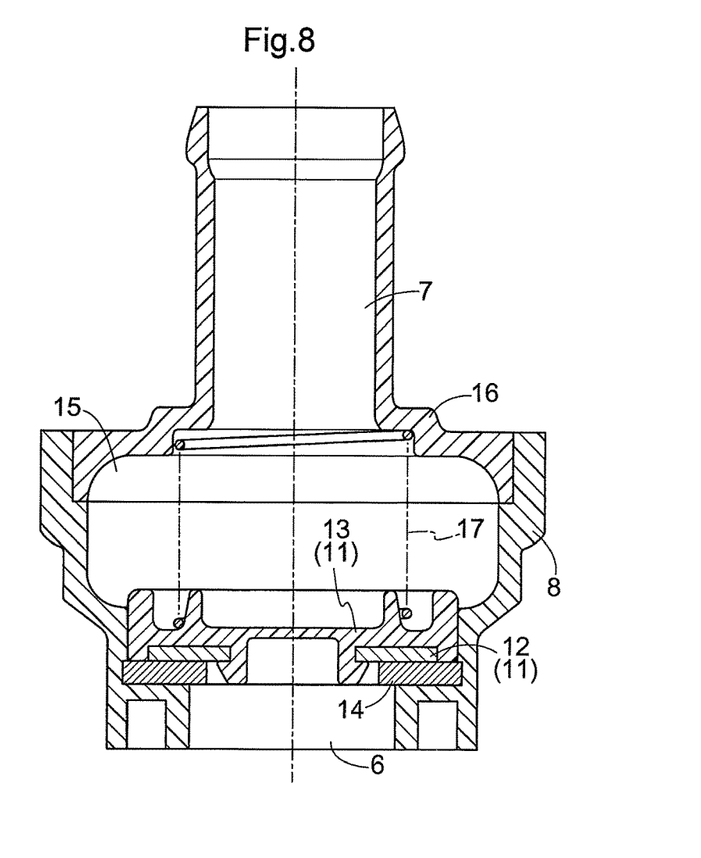
FIG. 8 is a section view showing a cooling liquid control valve according to a second embodiment.

In the case of a fluid control apparatus 20 according to this embodiment, the valve body 11 does not have the communication hole for small flow rate, as shown in FIG. 8. In this case, when a fluid feeding request of high emergency is present from the second flow passage 42 to the electric pump 31 under its stopped state, a control similar to the one described in the first embodiment with reference to FIG. 5 is effected. Namely, for the stopped electric pump 31, the control section 37 activates this electric pump 31 for increasing the control Duty to the preset Duty, when the valve body 11 under its closed state is now to be opened; namely, the output is increased.

Figure 9:
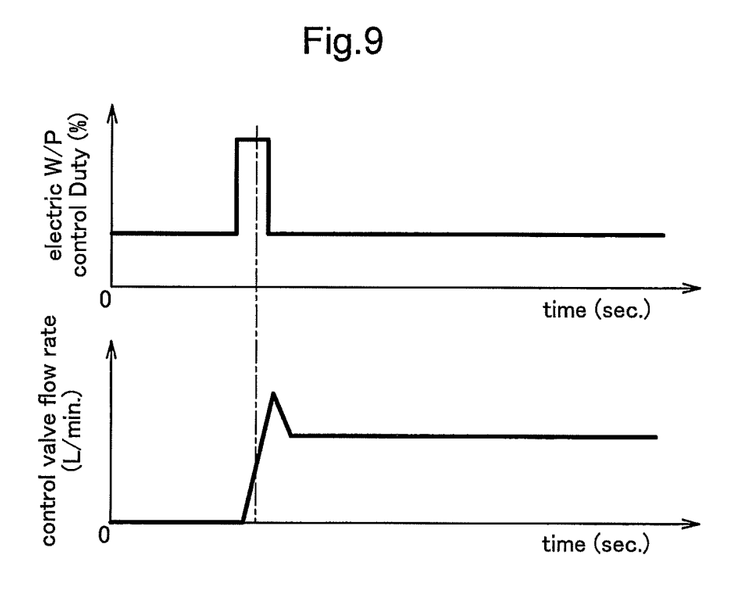
FIG. 9 is a diagram showing relation of an electric pump control Duty, a control valve flow rate, respectively relative to opened/closed states of control valve.

On the other hand, if a fluid feeding request of high emergency is present from the second flow passage 42 to the electric pump 31 which is currently under operation, fluid from the electric pump 31 is already fed to the other cooling component 36 via the bypass passage formed in the engine portion near the cooling liquid control valve 1 for instance. In this case, as shown in FIG. 9, the control section 37 increases the control Duty of the electric pump 31 which is set low in advance to the preset Duty, that is, increases the output. With this, the valve body 11 is switched into the opened state, so that fluid is fed via the cooling liquid control valve 1 to the heater core 33 of the second flow passage 42.

Other Embodiments

Figure 10:
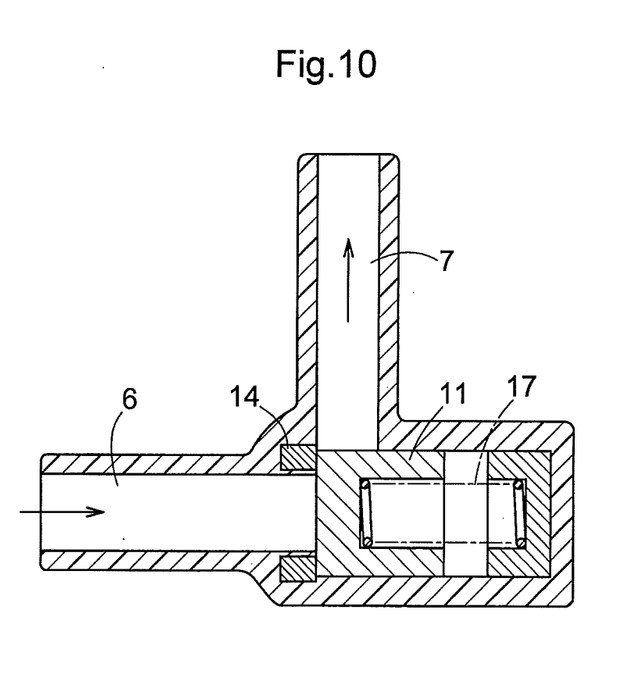
FIG. 10 is a section view showing a cooling liquid control valve according to a further embodiment.

In the foregoing embodiment, there was shown an example in which the inflow port 6 and the outflow port 7 are provided linearly in the cooling liquid control valve 1. Instead, as shown in FIG. 10, the cooling liquid control valve 1 can be configured such that the inflow port 6 and the outflow port 7 extend perpendicularly to each other.

In the foregoing embodiment, there was shown an example in which the cooling liquid control valve 1 is incorporated in the second flow passage 42 to the core heater 33. Instead, the cooling liquid control valve 1 can be configured to feed fluid to both the second flow passage 42 and the first flow passage 41 to the radiator 23.

In the foregoing embodiment, the fluid control apparatus 20 is used in the cooling system of the engine 21 main body. Alternatively, the apparatus may be applied to a catalyst type cooling system or a liquid cooling type oil cooler to be provided in an exhaust pipe, for instance. Further alternatively, the apparatus can be used as a cooling liquid control valve in a cooling system or an exhaust heat collection system of a heat source such as a motor used in an electric vehicle, an inverter, a secondary battery, a fuel cell, etc.

INDUSTRIAL APPLICATION

A fluid control apparatus relating to the present invention is applicable to a great variety of cooling objects in various kinds of vehicle.

DESCRIPTION OF REFERENCE MARKS/NUMERALS

1: cooling liquid control valve
11: valve body
11a: communication hole
14: valve seat
17: coil spring
20: flow rate control apparatus
23: radiator
33: heater core
36: cooling system component
31: electric pump
37: control section
41: first flow passage
42: second flow passage
Fm1, Fm2, Fm3: attraction force of magnet
Fs1, Fs2, Fs3: urging force of urging mechanism
Fw1, Fw2, Fw3: fluid force (force by fluid pressure)

The invention claimed is:

1. A fluid control apparatus comprising:
a valve body and a valve seat one of which is formed of a magnetic material and the other of which includes a magnet, the valve body and the valve seat being incorporated in a fluid flow passage and movable to come into contact with or away from each other to control communication of fluid;
an urging member configured to urge the valve body toward the valve seat;
an electric pump for flowing the fluid in the flow passage;
a control section for effecting first control to increase an output of the electric pump to a preset state when the valve body under a closed state as being in contact with the valve seat is to be opened, and for effecting second control to, after the valve body is opened in the first control, reduce the output of the electric pump, relative to the output of the electric pump in the first control, to a state which maintains an opened state of the valve body; and
a fluid communication hole in the valve body permitting fluid flow through the valve body when the valve body is under the closed state.

2. The fluid control apparatus according to claim 1, further comprising:
a first flow passage in which the fluid flows from the electric pump via a radiator;
a second flow passage in which the fluid flows from the electric pump via a heater core, with bypassing the radiator; and
wherein the control section increases the output of the electric pump in response to occurrence of a fluid request in the second flow passage.

3. The fluid control apparatus according to claim 2, wherein
the control section further increases the output of the electric pump when a fluid request is present in the second flow passage and the valve body is under the closed state.

4. A fluid control apparatus comprising:
a valve body and a valve seat one of which is formed of a magnetic material and the other of which includes a magnet, the valve body and the valve seat being incorporated in a fluid flow passage and movable to come into contact with or away from each other to control communication of fluid;
an urging member configured to urge the valve body toward the valve seat;
an electric pump for flowing the fluid in the flow passage;
a control section for effecting control to increase an output of the electric pump to a preset state when the valve body under a closed state as being in contact with the valve seat is to be opened; and
a fluid communication hole in the valve body permitting fluid flow through the valve body when the valve body is under the closed state.

5. The fluid control apparatus according to claim 4, further comprising:
a first flow passage in which the fluid flows from the electric pump via a radiator;
a second flow passage in which the fluid flows from the electric pump via a heater core, with bypassing the radiator; and
wherein the control section increases the output of the electric pump in response to occurrence of a fluid request in the second flow passage.

6. The fluid control apparatus according to claim 5, wherein
the control section further increases the output of the electric pump when a fluid request is present in the second flow passage and the valve body is under the closed state.

* * * * *